(Model.)

G. W. HAVILAND.
CULTIVATOR FENDER.

No. 250,527. Patented Dec. 6, 1881.

Witnesses,
Franck L. Ouraud
John R. Young

Inventor,
George W. Haviland
by W. H. Doolittle
Atty.

UNITED STATES PATENT OFFICE.

GEORGE W. HAVILAND, OF FORT DODGE, IOWA.

CULTIVATOR-FENDER.

SPECIFICATION forming part of Letters Patent No. 250,527, dated December 6, 1881.

Application filed August 22, 1881. (Model.)

*To all whom it may concern:*

Be it known that I, GEORGE W. HAVILAND, a citizen of the United States, residing at Fort Dodge, in the county of Webster and State of Iowa, have invented certain new and useful Improvements in Cultivator-Fenders; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in fenders attached to plow-cultivators, which are used to prevent young corn, sorghum, and other plants from being covered or injured by clods of dirt and stones thrown up by the action of the plows; and the objects of my improvements are to construct a fender in different parts, which may be removed and adjusted to accommodate its actions to the plants as they increase in size; to provide means for picking up the plants and holding them upright in advance of the plow until they are sustained by the fine loose dirt thrown up through the fender following, and means for raising the small and tender leaves of plants and preventing them from being covered when the fender is raised. I attain these objects by the means illustrated in the accompanying drawings, in which—

Figure 1:
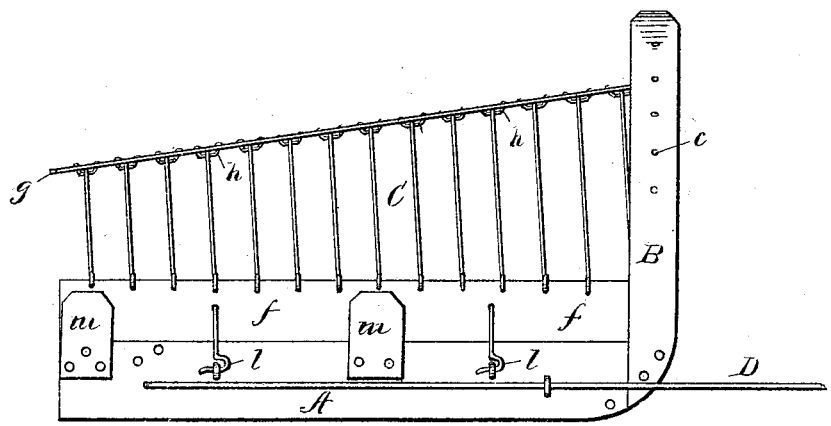
Figure 2:
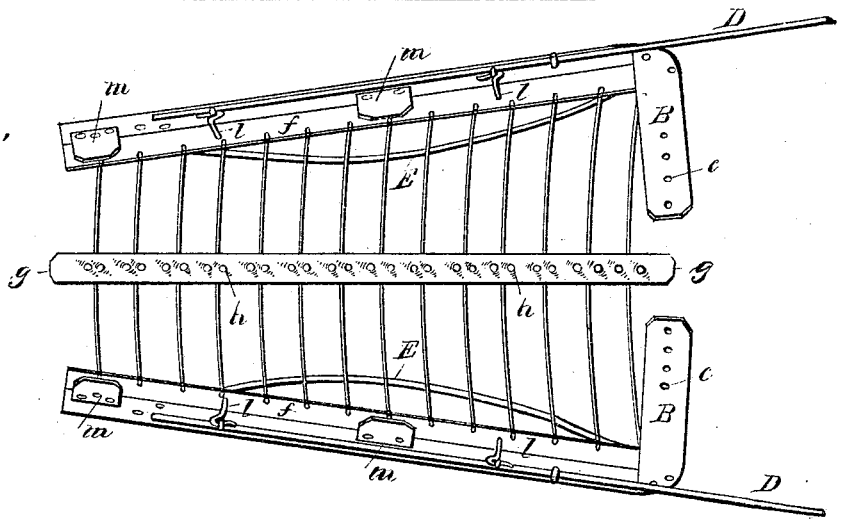

Figure 1 is a side elevation of the fender; Fig. 2, a top view, and Fig. 3 a bottom view, of the same.

Similar letters refer to similar parts throughout the several views.

The fender is composed of the bottom horizontal guards, A A, provided with the curved end pieces or arms, B B, the screen C, the outer rods, D D, and the inner curved rods, E E. It is attached to the plow by arms B B, which are provided with holes c, at suitable distances apart, by which means it can be raised as the plants increase in size. When, for instance, the fender is fastened to the plow through the top holes the guards A A rest on the ground. The guards A A are provided on their outer sides with pointed rods D D, which project beyond the front end of the fender a sufficient height and distance to pick up the plants that are lying down and hold them upright until the loose dirt, sifting through the wires of C on both sides of the hill, falls around and sustains them in their upright position.

Figure 3:
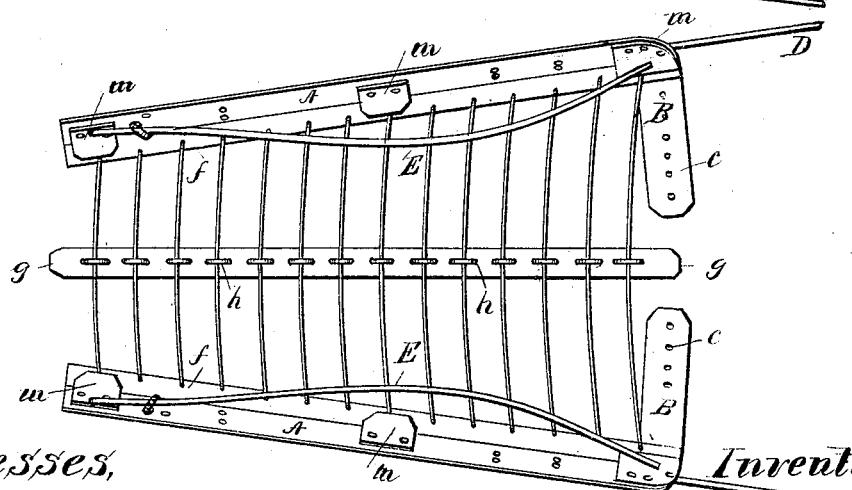

The screen C is constructed of wires in the form of an arch, which wires are spaced equidistantly, their ends looped into the horizontal pieces *f f*, and strengthened and supported at the top and their relative distances maintained by the bar *g*, provided on its under side with loops or clasps *h*, through which the wires are run, as shown in Fig. 3; or the wires may be fastened or riveted to the top bar by other means which will readily suggest themselves to the mechanic. The screen is attached to the bottom guard-pieces, A A, by hooks *l* and clasps *m;* or hasps or other well-known and suitable means may be employed, which will hold these parts together while at work and at the same time permit them to be readily detached.

The fender, when in position, is directly over the row between the shovels, and is made narrower behind than in front, to permit the dirt to be dropped nearer the foot of the plants than it would be if the fender were of the same width its entire length.

The curved rods E E, fastened to the inner sides of the lower guards, A A, serve to raise the small and tender leaves of the plants as the fender is raised from height to height by means of the pierced arms B B.

In operation the rods D first lift and support the plants, and they are then sustained by the fine soil passing through the screen on either side of the hill. The fender is raised from time to time as the plants increase in size, until finally the screen may be detached and its use dispensed with; and at whatever height the guards A may be raised when the plants are cultivated, the curved rods E serve the useful purpose of raising and sustaining the lower leaves.

Having thus described my invention, what I claim, and desire to secure by Letters Patent, is—

1. A cultivator-fender made narrower behind than in front, and provided with an arc-shaped detachable screen composed of wires, in combination with vertically-adjustable pierced arms and bottom horizontal guards, arranged and constructed substantially as described.

2. The combination of the vertical pierced arms B, the horizontal bottom guards, A, and the curved rods E, substantially as described.

3. The combination of the bottom guards, A, the outer rods, D, and the inner rods, E, substantially as described.

4. The combination of the screen C, the guards A, arms B, and outer and inner rods, D and E, substantially as described.

In testimony whereof I affix my signature in presence of two witnesses.

GEORGE W. HAVILAND.

Witnesses:
A. W. BOTSFORD,
M. S. FLEMING.